United States Patent
Mosby (10) Patent No.: US 11,176,852 B2
(45) Date of Patent: Nov. 16, 2021

(54) MOUNTING BRACKET SYSTEMS FOR SIGNS OR BANNERS

(71) Applicant: MS. CARITA SAFETRUCK, INC., Livermore, CA (US)

(72) Inventor: Gordon E. Mosby, Tracy, CA (US)

(73) Assignee: MS. CARITA SAFETRUCK, INC., Livermore, CA (US)

( * ) Notice: Subject to any disclaimer, the term of this patent is extended or adjusted under 35 U.S.C. 154(b) by 0 days.

(21) Appl. No.: 16/987,377

(22) Filed: Aug. 6, 2020

(65) Prior Publication Data

US 2021/0158729 A1     May 27, 2021

Related U.S. Application Data

(60) Provisional application No. 62/938,771, filed on Nov. 21, 2019.

(51) Int. Cl.
| | |
|---|---|
| *G09F 17/00* | (2006.01) |
| *G09F 7/18* | (2006.01) |
| *B60R 13/00* | (2006.01) |
| *G09F 21/04* | (2006.01) |

(52) U.S. Cl.
CPC ............ *G09F 17/00* (2013.01); *B60R 13/005* (2013.01); *G09F 7/18* (2013.01); *G09F 21/048* (2013.01); *G09F 2007/1865* (2013.01); *G09F 2017/0075* (2013.01)

(58) Field of Classification Search
CPC .......................... G09F 2017/0075; G09F 17/00
See application file for complete search history.

(56) References Cited

U.S. PATENT DOCUMENTS

| | | | | |
|---|---|---|---|---|
| 1,851,608 | A | * | 3/1932 | Vitali ..................... G09F 21/04 40/591 |
| 3,136,289 | A | * | 6/1964 | Johnson .................. G09F 17/00 116/28 R |
| 3,454,253 | A | | 7/1969 | Lippiatt |
| 3,623,690 | A | | 11/1971 | Bargman, Jr. |
| 4,231,606 | A | | 11/1980 | Tuerk |

(Continued)

FOREIGN PATENT DOCUMENTS

KR     20160112440 A     9/2016

*Primary Examiner* — David R Dunn
*Assistant Examiner* — Christopher E Veraa
(74) *Attorney, Agent, or Firm* — Nath, Goldberg & Meyer; Richard C. Litman (57) ABSTRACT

The mounting bracket systems are used in pairs to support a banner on a vehicle. In a first embodiment, the system includes opposing masts having upper and lower extending tabs adapted for attaching a banner between the masts, an annular flange disposed around the mast, and a lower mast end inserted into a bushing attached to a vehicle by U-shaped mounting straps. In a second embodiment, the system includes opposing masts having upper and lower extending tabs adapted for attaching a banner between the masts. The bottom end of each mast is attached to a platform having an elongate U-shaped pocket insert having planar walls extending from the platform opposite the mast. The pocket inserts are adapted for insertion into stake pockets common to trucks and trailers that haul oversize loads. A clevis pin may be inserted through opposing walls of the pocket insert below the stake pocket.

16 Claims, 7 Drawing Sheets

(56) References Cited

U.S. PATENT DOCUMENTS

| | | | | |
|---|---|---|---|---|
| 4,375,134 | A * | 3/1983 | Sheetz | G09F 7/00 |
| | | | | 116/173 |
| 5,076,196 | A * | 12/1991 | Chan | B60Q 1/52 |
| | | | | 116/28 R |
| 5,141,277 | A | 8/1992 | Alexander | |
| 5,172,505 | A * | 12/1992 | Borsella | G09F 7/20 |
| | | | | 40/604 |
| 5,255,464 | A * | 10/1993 | Marecek | G09F 21/048 |
| | | | | 40/588 |
| 5,388,794 | A | 2/1995 | Wolff | |
| 5,502,909 | A * | 4/1996 | Rabkin | B60Q 1/50 |
| | | | | 40/591 |
| 6,808,098 | B1 * | 10/2004 | Bickett, III | B60D 1/36 |
| | | | | 116/173 |
| 7,594,478 | B2 | 9/2009 | Karnes et al. | |
| 7,841,116 | B2 * | 11/2010 | Whelan | G09F 15/0025 |
| | | | | 40/604 |
| 9,010,000 | B1 | 4/2015 | Rodriguez | |
| 9,914,403 | B1 * | 3/2018 | Richardson | B60Q 1/2657 |
| 2004/0173724 | A1 | 9/2004 | Tolna | |
| 2006/0156600 | A1 * | 7/2006 | Barker | G09F 21/04 |
| | | | | 40/591 |
| 2009/0133616 | A1 * | 5/2009 | Karnes | B62D 33/0207 |
| | | | | 116/173 |
| 2012/0318189 | A1 | 12/2012 | Oyoung | |
| 2014/0345048 | A1 * | 11/2014 | Mueller | A45F 3/24 |
| | | | | 5/119 |
| 2015/0294605 | A1 * | 10/2015 | Conway | G09F 17/00 |
| | | | | 116/173 |

* cited by examiner

MOUNTING BRACKET SYSTEMS FOR SIGNS OR BANNERS

CROSS-REFERENCE TO RELATED APPLICATION

This application claims the benefit of U.S. Provisional Patent Application No. 62/938,771, filed on Nov. 21, 2019.

BACKGROUND

1. Field

The disclosure of the present patent application relates to signs or banners, and particularly to mounting bracket systems for signs or banners.

2. Description of the Related Art

Signs and banners are useful for displaying information, such as advertising, directional, or safety-related information. It is often desirable to display such information, particularly safety information, on vehicles, such as small and large trucks or trailers. This information may relate to the size or weight of the vehicle, such as wide or oversized load information. These signs and banners are often supported by brackets. Many of these brackets are limited to the type of surface to which they can be attached, requiring specific mounting structures. Some of the brackets are designed to be placed in stake pockets found on small and large trucks, as well as some trailers. Unfortunately, stake pockets are often damaged, due to their location adjacent to the outer portions of these vehicles. When the stake pocket is damaged it may be difficult, if not impossible, to insert or remove the bracket into or out of the stake pocket.

Thus, mounting bracket systems for signs or banners solving the aforementioned problems are desired.

SUMMARY

The mounting bracket systems for signs or banners include two embodiments of brackets intended to be used in pairs to support a banner on a vehicle. The first embodiment of the system includes an upper mast having upper and lower extending tabs with orifices for attaching one end of the banner to the mast; an annular flange disposed around the mast; and a lower mast end for attachment to a supporting member. The first embodiment of the system includes a universal mounting bracket. The lower end of the mast is circular and extends into a bushing. The annular flange engages the top face of the bushing. The bushings are secured to a vehicle's (or other) outer vertical surface by U-shaped mounting straps. The second embodiment of the system is intended to be supported within a standard rectangular stake pocket found on heavy trucks and trailers. The lower end of the mast has a three-sided, generally orthogonal stake pocket insert. The bracket is inserted with the open side of the pocket insert facing outward, so that even if the stake pocket is damaged or bent inwardly, the pocket insert can still be received within and removed from the stake pocket. The pocket insert is secured by a bent clevis pin inserted through aligned holes in the stake pocket insert, and a hitch pin clipped to the clevis pin.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
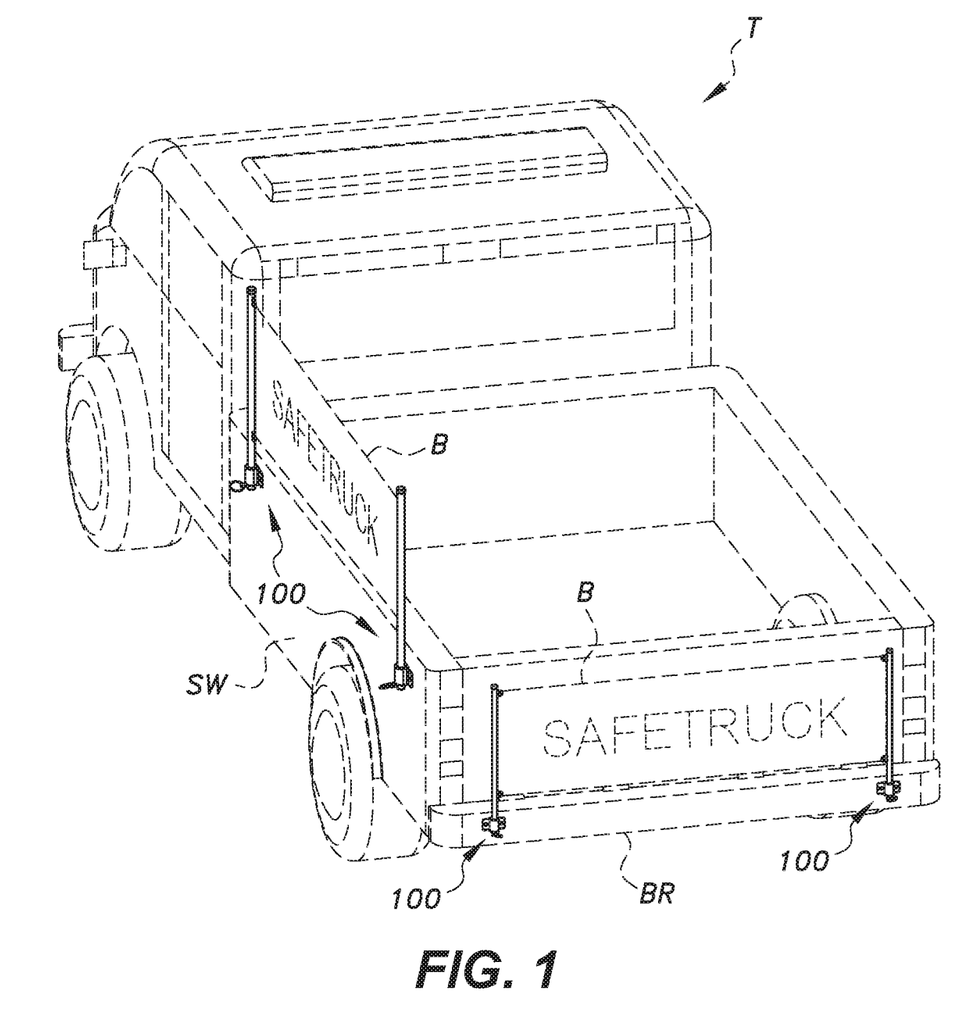
FIG. 1 is an environmental, perspective view of a first embodiment of a mounting bracket system for signs or banners.

The mounting bracket systems for signs or banners include two embodiments of a system of brackets intended to be used in pairs to support a banner on a vehicle. In a first embodiment, the system 100 utilizes a pair of universal mounting brackets for each banner B and is shown in FIG. 1 supporting banners B on a side wall SW and a bumper BR of a truck T. These support surfaces are shown as an example, and any support surface, such as a stationary wall, vehicle sidewall or other vertical surfaces, may be used as a support surface. Further, while it is preferable that the surface is as close as possible to vertical for visibility, other surfaces up to and including horizontal surfaces may be desirable in some applications.

Figure 3:
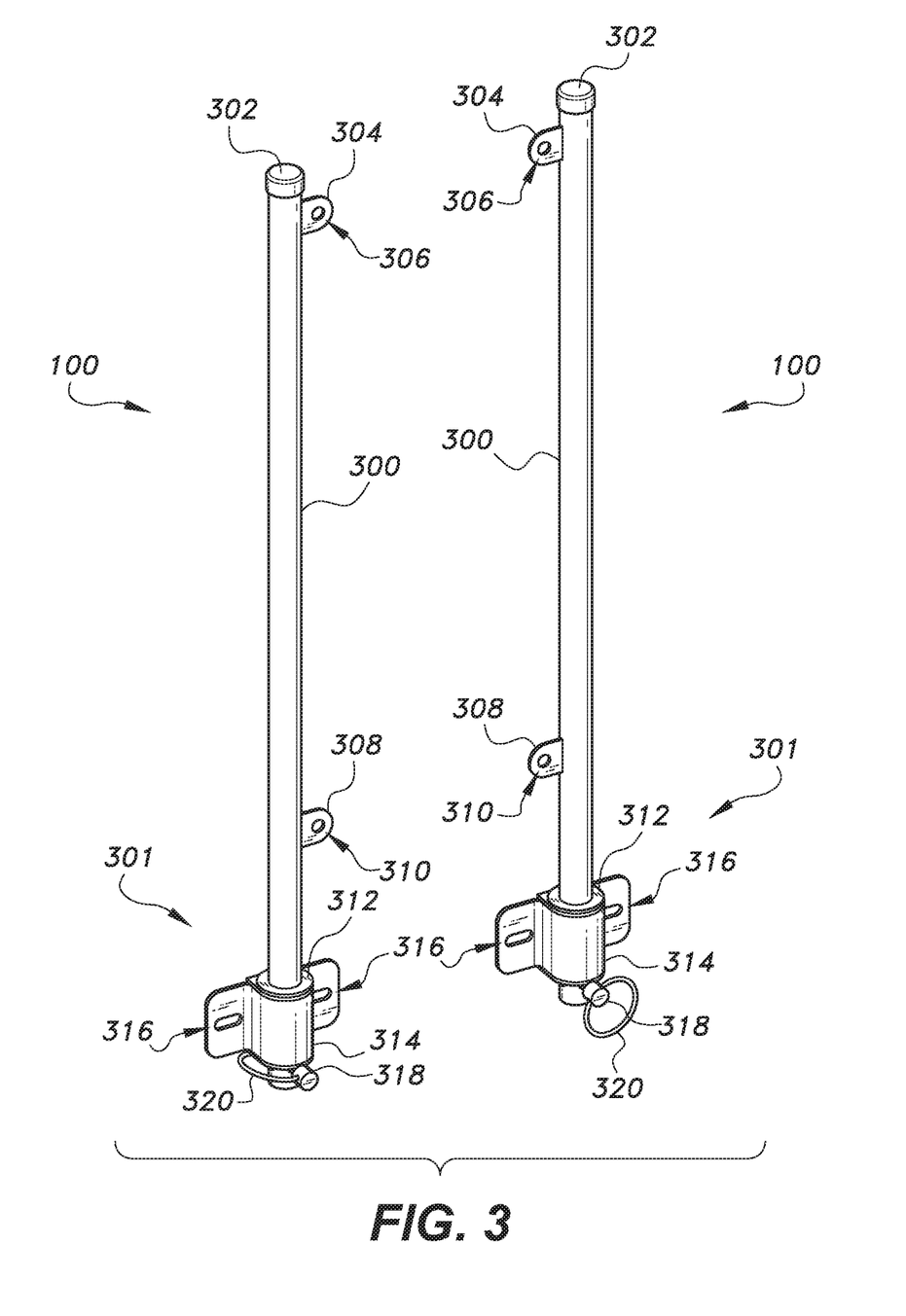
FIG. 3 is a perspective view of the mounting brackets at opposing ends of the sign in the system of FIG. 1.
Figure 4:
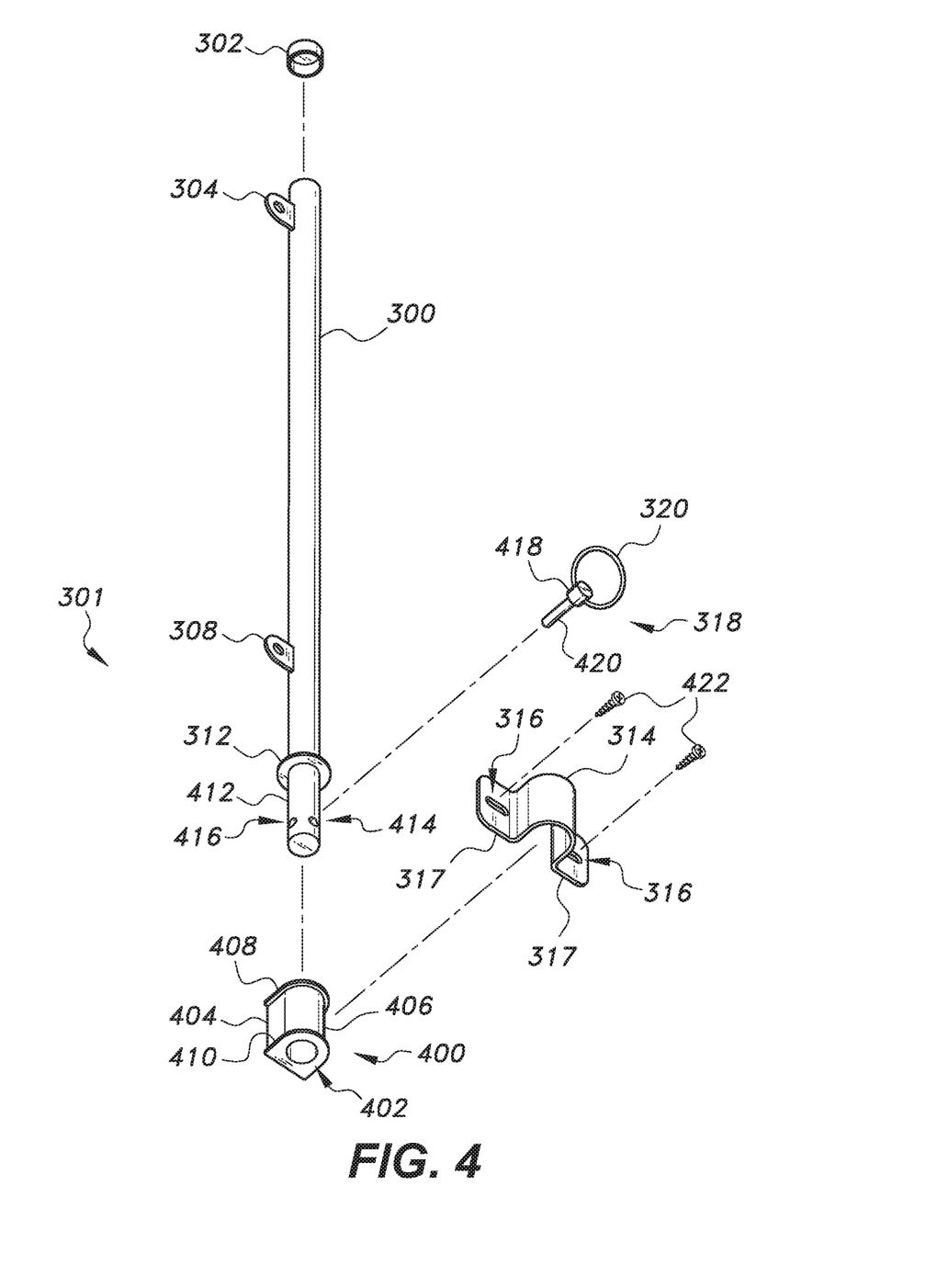
FIG. 4 is an exploded perspective view of one of the mounting brackets in the system of FIG. 1.

The details of the first system 100 are shown in FIGS. 3 and 4. In FIG. 3, opposing banner supports are shown to illustrate the cooperating position in which two brackets support a banner or sign there-between. The system 100 includes an upper mast 300 having upper 304 and lower 308 laterally extending tabs. A cap 302 covers the top of mast 300 to protect and seal the mast 300, particularly when the mast 300 is hollow. The upper extending tab 304 includes a through-hole 306, while the lower extending tab 308 also includes a through-hole 310. The through-holes 306, 310 are used to attach one end of the banner B to the mast 300 using string, rope, nylon cord, or other attaching means.

The bottom portion 301 of the mast 300 of the first system 100 includes an annular flange 312 and a lower end 412 for attachment to a supporting member or surface. The lower end 412 of the mast 300 is cylindrical and extends into a central hole 402 in a bushing 400. The flange 312 is circular and engages a top flange 408 of the bushing 400. The bushing 400 is secured to a vehicle's (or other) outer vertical surface by a U-shaped strap 314 or bracket that includes two fastener openings 316 in opposite ends 317 of the strap 314. Fasteners 422 extend through the openings 316 and into the supporting surface, such as the side wall SW or the bumper BR of a truck T, as shown in FIG. 1. The fasteners 422 may be sheet metal screws, as shown, or any other fastener suitable for the type of surface to which the U-shaped strap 314 is affixed. The bushing 400 is generally cylindrical, but may include a flat surface 404 that contacts or abuts the supporting surface and a rounded outer surface 406 that nests within the U-shaped strap 314. The top flange 408 and a lower flange 410 of the bushing 400 maintain the bushing's vertical position within the U-shaped strap 314.

Alternatively, the strap 314 may not be U-shaped, but may be straight or linear, having a short cylinder or ferrule welded thereto between the fastener openings 316. The bushing 400 may be a cylinder of low friction material inserted into the ferrule, and having a top annular flange that rests on the top edge of the ferrule, the flange 312 of the mast 300 resting on the top flange of the bushing 400.

The lower end 412 of the mast 300 further includes a first through-hole 414 and a second through-hole 416 orthogonal to the first through-hole 414. A locking linchpin 318 includes a cylindrical shaft 420 that is inserted into either the first through-hole 414 or the second through-hole 416 after the lower end 412 of the mast 300 has been inserted into the central hole 402 of the bushing 400 to thereby secure the lower end 412 of the mast 300 inside the bushing 400 using the flange 312 and the locking linchpin 318. It should be noted that the first through-hole 414 and the second through-hole 416 extend perpendicular to one another to increase the ability to insert the locking linchpin 318 into one hole 414, 416 or the other, whichever is not blocked by proximate obstacles. The locking linchpin 318 further includes an increased diameter head 418 and a locking pin ring 320 having ends that are attached to the head 418, thereby providing a spring action that keeps the locking pin ring 320 in a locked position against the cylindrical shaft 420 of the locking linchpin 318, thereby locking the cylindrical shaft 420 within the respective hole 414, 416. The locking pin ring 320 is shown in its spring-biased locked position in the left-hand example of the first system 100 in FIG. 3 and is shown in its spring-tensioned unlocked position in the right-hand example of the first system 100 in FIG. 3.

Figure 2:
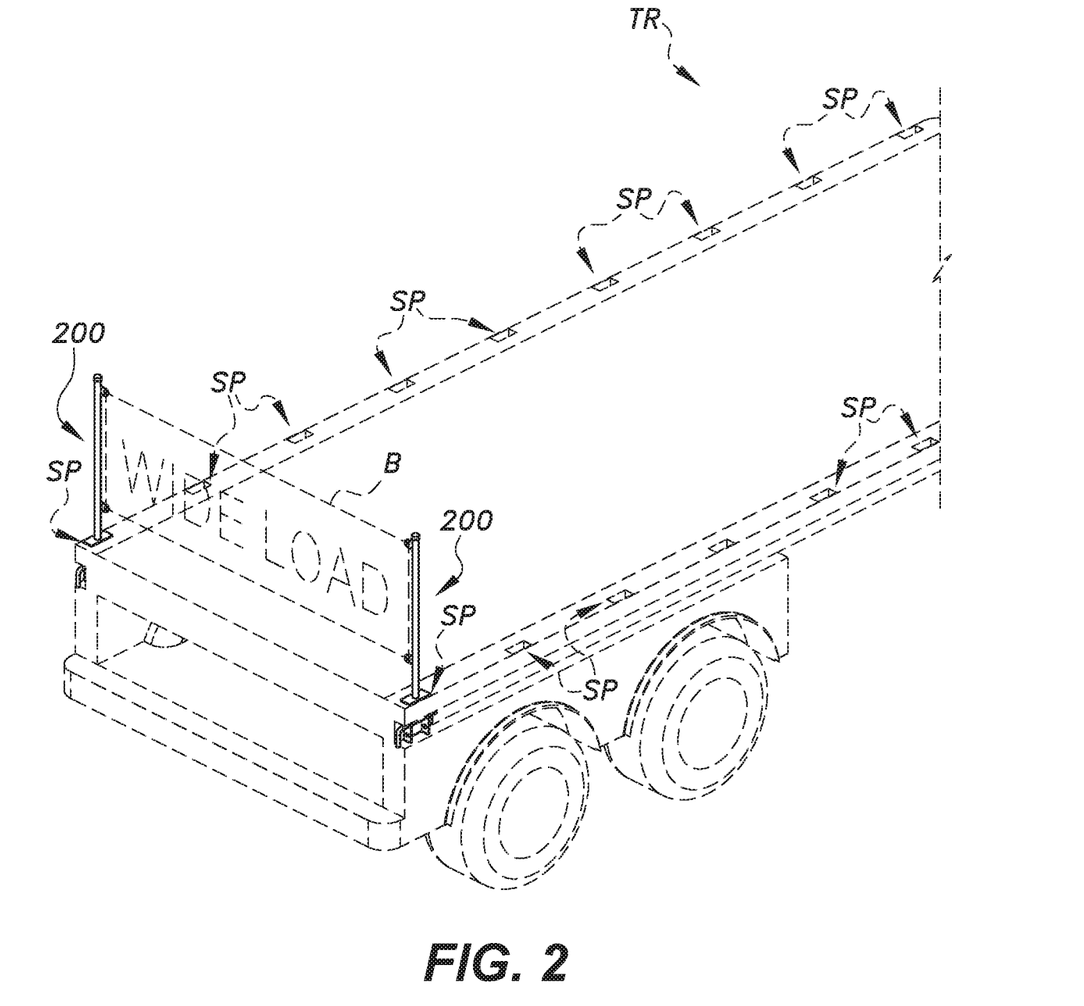
FIG. 2 is an environmental, perspective view of a second embodiment of a mounting bracket system for signs or banners.
Figure 5:
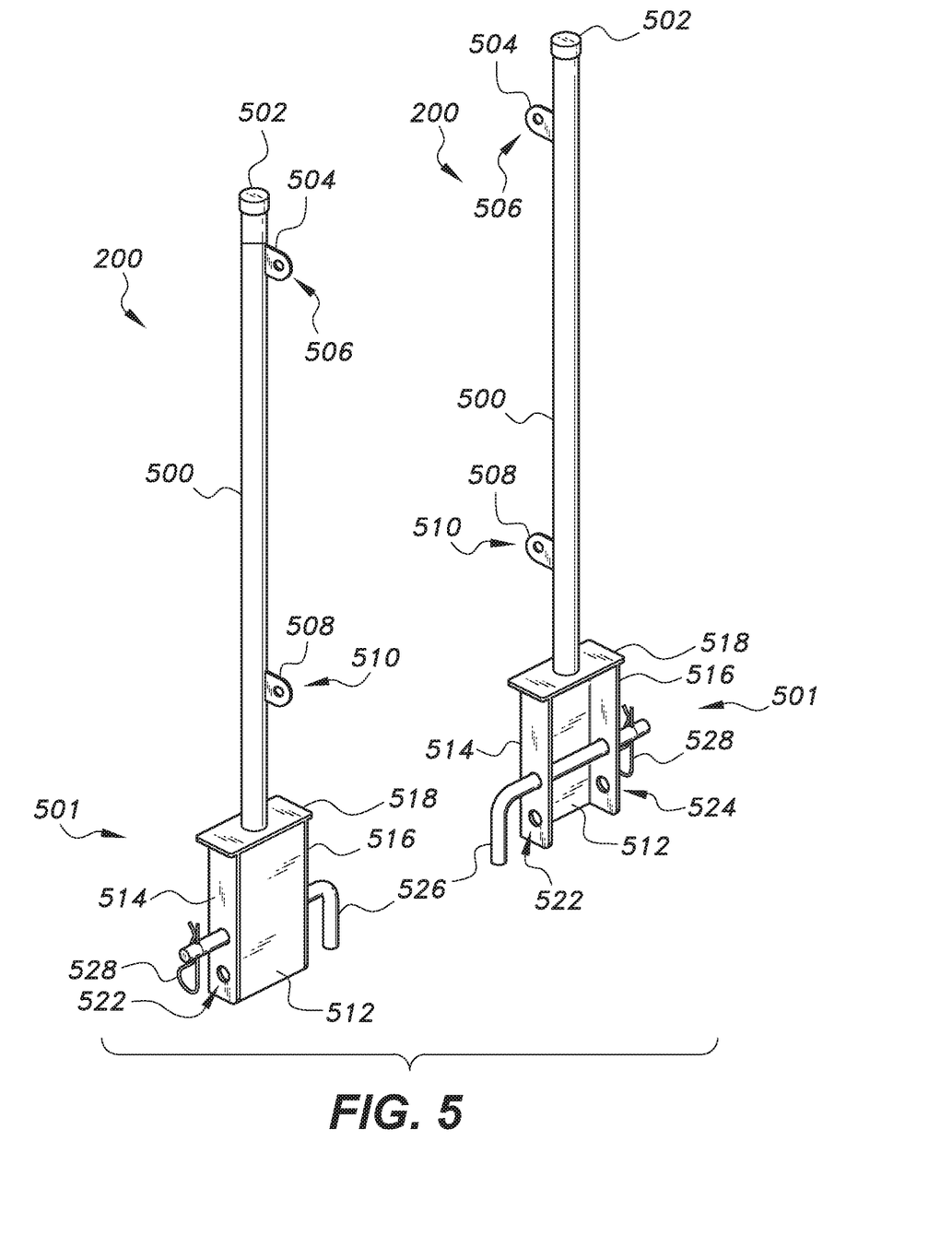
FIG. 5 is a perspective view of the mounting brackets at opposing ends of the sign in the system of FIG. 2.

In the second embodiment, the system 200 is intended to support a banner B within a standard rectangular stake pocket SP found on heavy trucks and trailers TR, as shown in FIG. 2. The details of the second embodiment 200 of the brackets are shown in FIGS. 5-9. As with the first embodiment, the system 200 includes a mast 500 having upper 504 and lower 508 laterally extending tabs. A cap 502 covers the top of mast 500 to protect and seal the mast 500, particularly when the mast 500 is hollow. The upper tab 504 includes a through-hole 506, while the lower tab 508 also includes a through-hole 510. The through-holes 506, 510 are used to attach one end of the banner B to the mast 500 using string, rope, nylon cord, or other attaching means. In FIG. 5, opposing masts 500 are arranged in an opposite orientation to one another to illustrate their relative positions when supporting opposite ends of a banner or sign therebetween.

Figure 6:
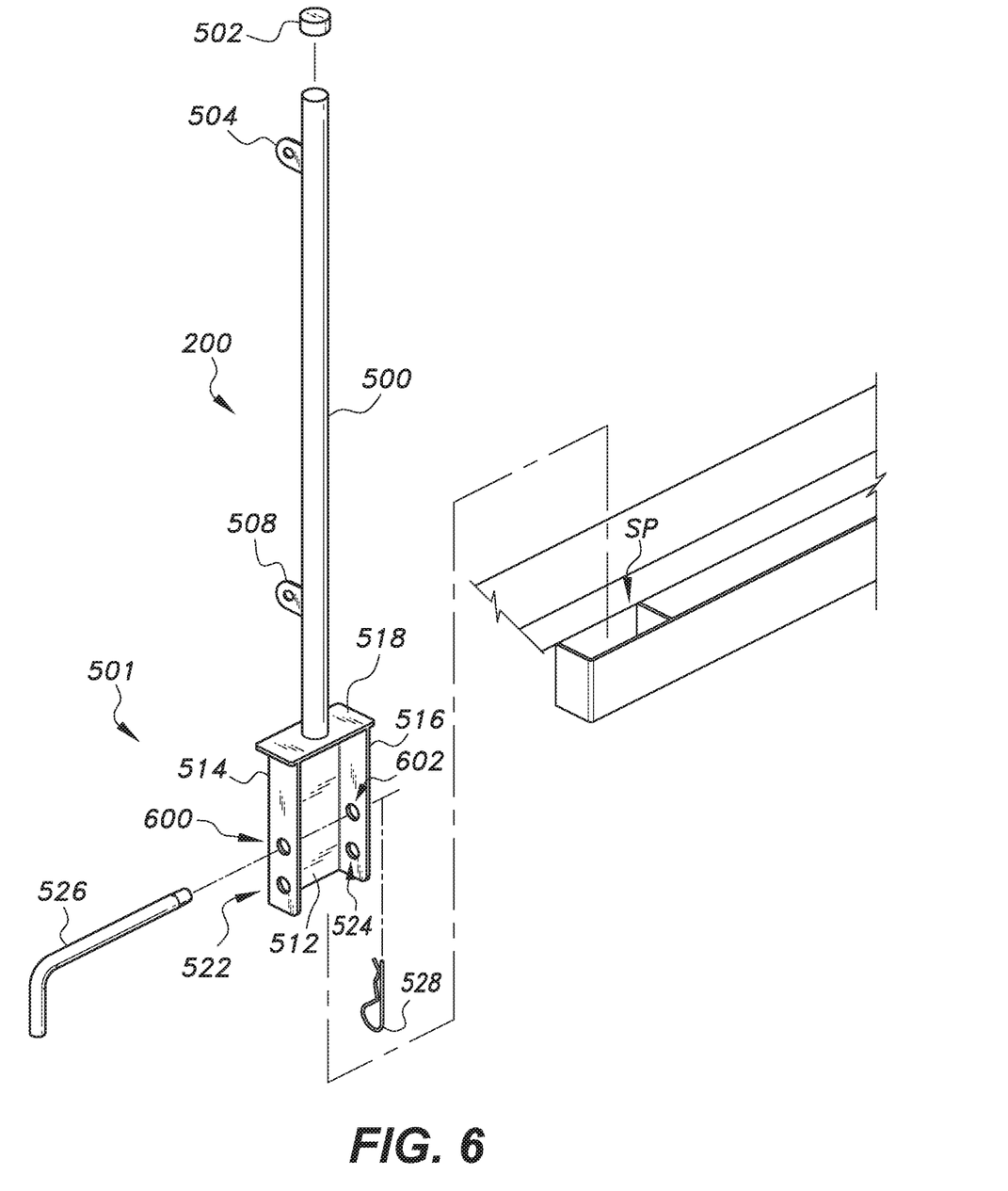
FIG. 6 is an exploded perspective view of one of the mounting brackets of the system of FIG. 2.
Figure 7:
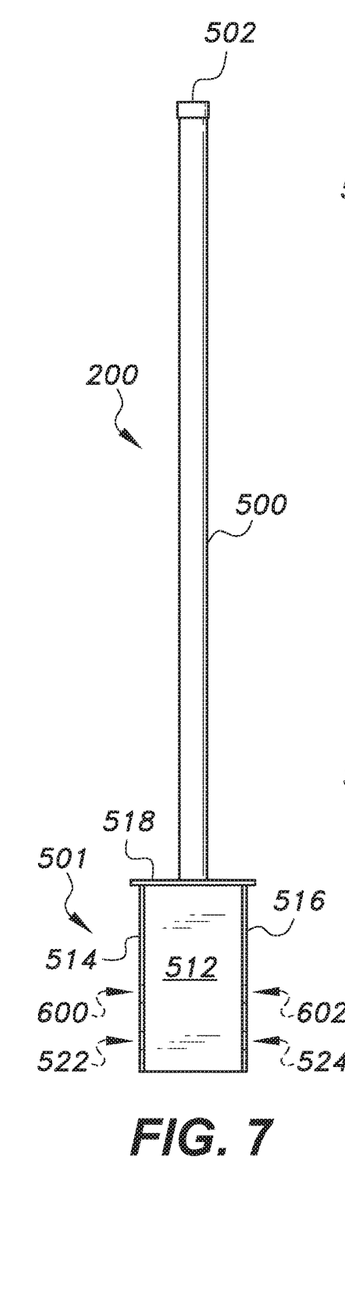
FIG. 7 is a front view of the mounting bracket of FIG. 6.

The bottom portion 501 of each mast 500 is attached to a three-sided, generally orthogonal stake pocket insert. The insert includes a first generally planar wall 514 and a parallel second generally planar wall 516 that are connected by a third generally planar wall 512, thereby forming a three-sided insert with an open side that is opposite wall 512. The insert below the mast 500 is inserted into a stake pocket SP with the open side of the insert facing outward, so that if the stake pocket SP is damaged or bent inward, the pocket insert can still be received within and removed from the stake pocket SP. The tabs 504, 508 extend from the mast 500 in the opposite direction of the open side of the insert, such that when the pocket insert is inserted into a stake pocket SP with its open side facing outward, a banner B can be supported between two systems 200, as shown in FIG. 2. The lower end of the first wall 514 includes through-holes 522 and 600, and the lower end of the second wall 516 includes through-holes 524 and 602. A locking clevis pin 526 is extended through either through-holes 522 and 524 or through-holes 600 and 602, depending on the length of the stake pocket insert extending out of the bottom of the stake pocket SP.

Figures 8, 9, 10, 11:
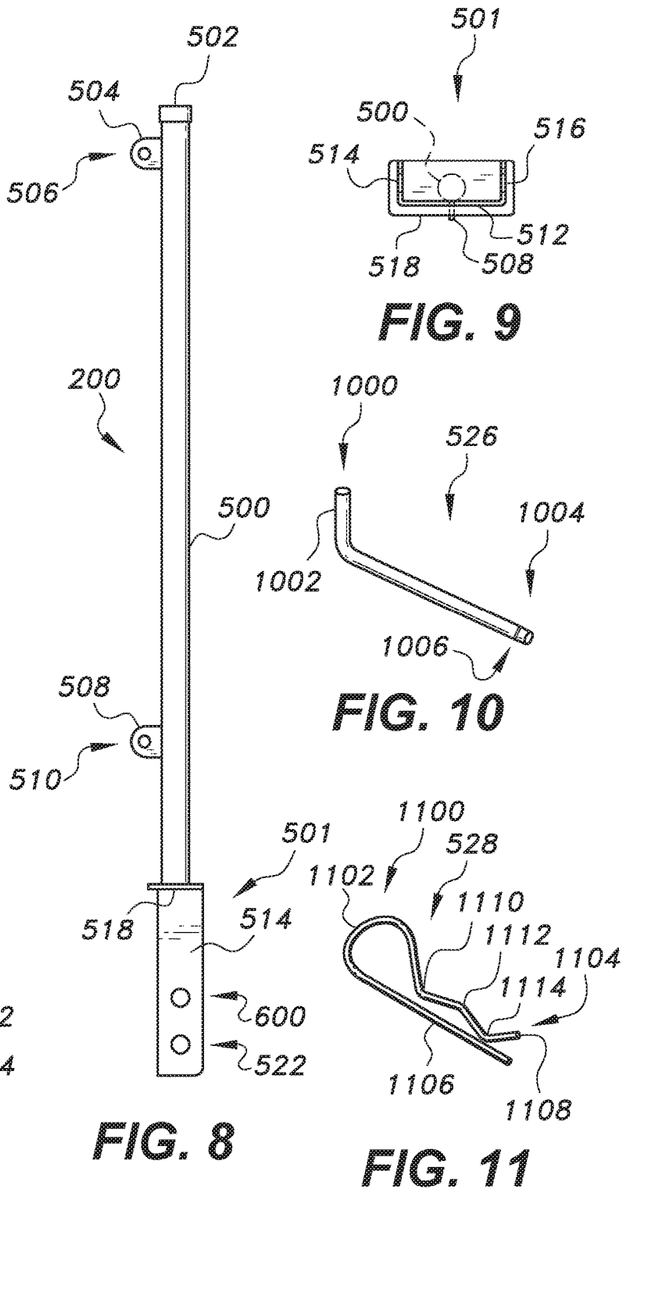
FIG. 8 is a side view of the mounting bracket of FIG. 6.
FIG. 9 is a bottom view of the mounting bracket of FIG. 6.
FIG. 10 is a perspective view of a locking pin for use with the mounting brackets of the system of FIG. 2.
FIG. 11 is a perspective view of a hitch pin for use with the locking pin of FIG. 10.

The details of the locking pin 526 and an associated hitch pin 528 are shown in FIGS. 10 and 11. The locking clevis pin 526 includes a first end 1000 with a bent lateral section 1002 that is at an obtuse angle to the longitudinal length of the locking pin 526. The locking pin 526 also has a second end 1004 with a through-hole 1006 defined therein. Once the locking pin 526 has been inserted through the selected though holes 522, 524 or 600, 602, the hitch pin 528 is inserted through the through-hole 1006 and clipped to the second end 1004 of the locking pin 526. The bent lateral section 1002 and the hitch pin 528 thereby maintain the locking pin 526 within the selected though holes 522, 524 or 600, 602. The hitch pin 528 includes a first end 1100 with an arcuate section 1102 and a second open end 1104. One side 1106 of the hitch pin 528 is straight, while the second side 1108 includes first 1110, second 1112 and third bends 1114. When the straight side 1106 of the hitch pin 528 is inserted through the hole 1006 in the locking pin 526, the bends 1110, 1112 and 1114 hold the hitch pin in place on the locking pin, as is known with conventional hitch pins.

The top of the insert includes a generally rectangular, planar platform 518 that is attached to the top of the first 514, second 516 and third 512 walls and extends beyond the first 514, second 516 and third 512 walls. When the insert is placed within a stake pocket SP, the platform 518 rests on top of the stake pocket SP and limits the amount the insert extends into the stake pocket SP. The mast 500 is attached to a central position of the platform 518, e.g., by welding, and extends substantially perpendicularly and upwardly from the platform 518.

It is to be understood that the mounting bracket systems for signs or banners are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A mounting bracket system for signs or banners, the system comprising:

a pair of elongated masts, each of the masts having an annular flange, a banner-mounting portion above the flange, and a vehicle mounting portion below the flange;

upper and lower tabs extending laterally from the banner-mounting portion of each of the masts, each of the tabs having an attachment hole defined therein adapted for attaching a sign or banner to the mast;

a pair of mounting straps, each of the straps being adapted for attaching the vehicle mounting portion of the corresponding mast to a vehicle; and a pair of locking pins, the vehicle mounting portion of each of the masts having at least one transverse bore defined therein below the corresponding mounting strap, the locking pins being removably insertable through the corresponding at least one transverse bore to selectively lock the masts to the vehicle.

2. The mounting bracket system as recited in claim 1, wherein:
the at least one transverse bore comprises a first transverse bore and a second transverse bore extending perpendicular to the first transverse bore; and
each of the locking pins are selectively insertable through one of the transverse bores in the corresponding mast, respectively, to selectively lock the masts to the vehicle.

3. The mounting bracket system as recited in claim 1, further comprising a pair of bushings, each of the bushings having a central hole, each of the mounting straps attaching a corresponding one of the bushings to the vehicle, the vehicle mounting portion of the corresponding mast extending through the central hole in the corresponding bushing to mount the corresponding mast to the vehicle.

4. The mounting bracket system as recited in claim 3, wherein each of the bushings includes a top flange, the annular flange of the corresponding mast engaging the top flange of the bushing to limit travel of the vehicle mounting portion of the mast through the central hole in the bushing.

5. The mounting bracket system as recited in claim 4, wherein:
the bushings include lower flanges; and
the top flanges and the lower flanges of the bushings maintain the bushings' vertical position within the mounting straps.

6. The mounting bracket system as recited in claim 5, wherein:
each of the bushings is generally cylindrical, having a flat vehicle-facing surface and a rounded outer surface;
the mounting straps are U-shaped;
the flat vehicle-facing surface is adapted for contacting a surface of the vehicle; and
the rounded outer surface nests within the corresponding U-shaped mounting strap.

7. The mounting bracket system as recited in claim 1, wherein:
the elongated masts are hollow and include tops; and
the mounting bracket system further comprises a pair of caps that cover the tops of masts to seal the masts.

8. The mounting bracket system for signs or banners as recited in claim 1, wherein each of the locking pins comprises:
a cylindrical shaft having a proximal end and a distal end;
a head disposed on the proximal end of the shaft, the head having a greater diameter than the shaft and a greater diameter than the at least one transverse bore defined in each of the masts; and
a locking pin ring extending through the head of the shaft, the locking pin ring being pivotal between a locked position against the shaft, limiting movement of the locking pin through the at least one transverse bore, and an unlocked position permitting free movement if the shaft through the at least one transverse bore.

9. The mounting bracket system as recited in claim 1, wherein each of the mounting straps has fastener openings defined in opposite ends of the mounting strap adapted for receiving a fastener for attaching the mounting strap to the vehicle.

10. A mounting bracket system for signs or banners, the system comprising:
a pair of elongated masts, each of the masts having a banner-mounting portion and a bottom end;
upper and lower tabs extending laterally from the banner-mounting portion of each of the masts, each of the tabs having an attachment hole defined therein adapted for attaching a sign or banner to the mast;
a pair of pocket inserts, each of the masts having a corresponding one of the pocket inserts attached to the bottom end of the mast, each of the pocket inserts having:
a pair of parallel side walls, the side walls having at least one aligned pair of apertures defined therein;
a back wall extending between the parallel side walls, the side walls and the back wall defining a U-shaped insert having planar walls and an open side; and
a platform mounted on top of the U-shaped insert, the bottom end of the mast being attached to the platform, the U-shaped insert of each of the pocket inserts being adapted for insertion into a stake pocket; and
a clevis pin removably inserted through the at least one aligned pair of apertures in the side walls of each of the U-shaped inserts below the stake pocket.

11. The mounting bracket system for signs or banners as recited in claim 10, wherein the at least one aligned pair of apertures comprises two aligned pairs of apertures.

12. The mounting bracket system as recited in claim 10, wherein the clevis pin is elongated, having a first end defining an elbow and a second end having a transverse bore defined therein, the system further comprising a hitch pin having a straight leg and a clamping leg having a plurality of undulating bends, the clamping leg extending parallel to and being resiliently biased against the straight leg so that when the straight leg is inserted through the transverse bore, the clamping leg bears against the clevis pin to secure the clevis pin to the U-shaped insert below the stake pocket, the elbow in the clevis pin preventing the clevis pin from sliding through the aligned holes in the U-shaped insert.

13. The mounting bracket system as recited in claim 10, wherein the platform extends beyond the pair of parallel side walls and the back wall, forming a stop to thereby limit the amount the insert extends into the stake pocket.

14. The mounting bracket system as recited in claim 10, wherein the upper and lower tabs extend in a direction opposite to the open side of the U-shaped insert.

15. The mounting bracket system as recited in claim 10, wherein each of the elongated masts is hollow and has an open top end, the system further comprising a pair of caps covering the open top end of each of the masts, respectively, to seal the masts.

16. A mounting bracket system for signs or banners, the system comprising:
a pair of hollow elongated masts, each of the masts having a banner-mounting portion, a bottom end, and a top end;
upper and lower tabs extending laterally from the banner-mounting portion of each of the masts, each of the tabs having an attachment hole defined therein adapted for attaching a sign or banner to the mast;
a pair of pocket inserts, each of the masts having a corresponding one of the pocket inserts attached to the bottom end of the mast, each of the pocket inserts having:
a pair of parallel side walls, the side walls having two aligned pairs of apertures defined therein;
a back wall extending between the parallel side walls, the side walls and the back wall defining a U-shaped insert having planar walls and an open side, the upper and lower tabs extending in a direction opposite to the open side of the U-shaped insert; and a platform mounted on top of the U-shaped insert, the bottom end of the corresponding mast being attached to the platform, the U-shaped insert being adapted for insertion into a stake pocket, the platform extending beyond the pair of parallel side walls and the back wall, forming a stop to thereby limit the amount the insert extends into the stake pocket;

a clevis pin removably inserted through at least one of the aligned pair of apertures in the side walls of each of the U-shaped inserts, respectively, the at least one aligned pair of apertures being below the stake pocket, the clevis pin being elongated, having a first end defining an elbow and a second end having a transverse bore defined therein;

a hitch pin having a straight leg and a clamping leg having a plurality of undulating bends, the clamping leg extending parallel to and being resiliently biased against the straight leg so that when the straight leg is inserted through the transverse bore, the clamping leg bears against the clevis pin to secure the clevis pin to the U-shaped insert below the stake pocket, the elbow in the clevis pin preventing the clevis pin from sliding through the aligned holes in the U-shaped insert; and a pair of caps covering the top ends of the masts, respectively, to seal the masts.

\* \* \* \* \*